United States Patent [19]

Wells

[11] Patent Number: 4,655,126
[45] Date of Patent: Apr. 7, 1987

[54] COOKING APPARATUS

[76] Inventor: Harold D. Wells, 14015 Margaux, Chesterfield, Mo. 63017

[21] Appl. No.: 730,673

[22] Filed: May 3, 1985

[51] Int. Cl.$^4$ ............................................. A47J 37/04
[52] U.S. Cl. ....................................... 99/386; 99/391; 99/401; 99/443 C; 99/447; 198/774
[58] Field of Search ............ 99/386, 389, 391, 443 C, 99/401, 447; 426/523; 198/774; 414/525 B

[56] References Cited

U.S. PATENT DOCUMENTS

| | | | |
|---|---|---|---|
| 4,008,996 | 2/1977 | Wells | 99/443 C X |
| 4,188,868 | 2/1980 | Baker | 99/386 |
| 4,198,560 | 4/1980 | Dietrich | 198/774 X |
| 4,245,613 | 1/1981 | Wells et al. | 99/443 C X |
| 4,366,177 | 12/1982 | Wells et al. | 99/443 C X |
| 4,389,562 | 6/1983 | Chaudoir | 99/386 X |

*Primary Examiner*—Billy J. Wilhite
*Attorney, Agent, or Firm*—Cohn, Powell & Hind

[57] ABSTRACT

This cooking apparatus includes a housing assembly providing a heating chamber having an entrance and an exit, and a conveyor assembly extending through the heating chamber and having end portions extending outwardly of the heating chamber. The heating chamber includes vestibule portions at each end and heater elements within the chamber provide zone-controlled heating. The conveyor assembly includes stationary rails defining a coplanar product-receiving surface alternating with moving rails defining a coplanar product-receiving surface having orbital motion relative to the stationary surface to lift the product, transport it forwardly and deposit it so that the product moves intermittently through the heating chamber. The relative motion of the rails is provided by rotatable transverse shafts having eccentric portions supporting bearings provided at each end of the movable rails and both sets of rails are restrained from longitudinal movement at one end and are liftably removable from their supports to facilitate cleaning. The rails are perforated lengthwise to inhibit heat loss by conduction and include spacers to facilitate alignment and carry stop members to limit longitudinal movement of the product.

17 Claims, 19 Drawing Figures

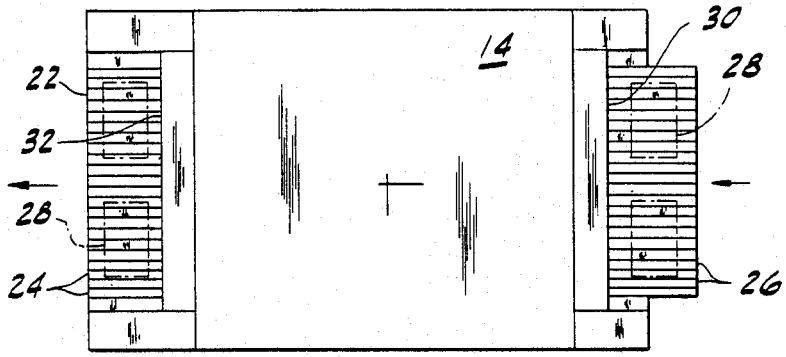
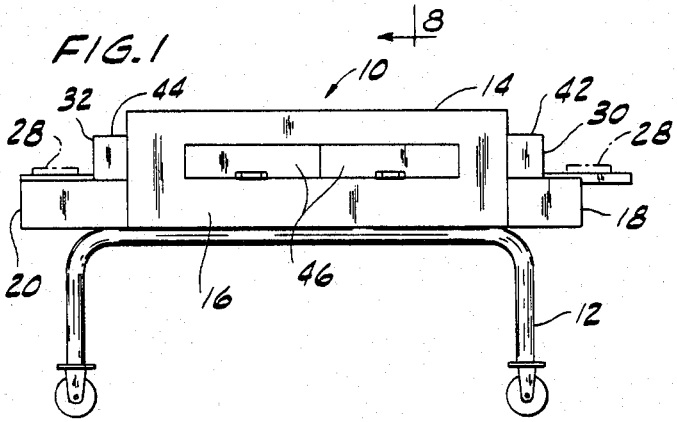
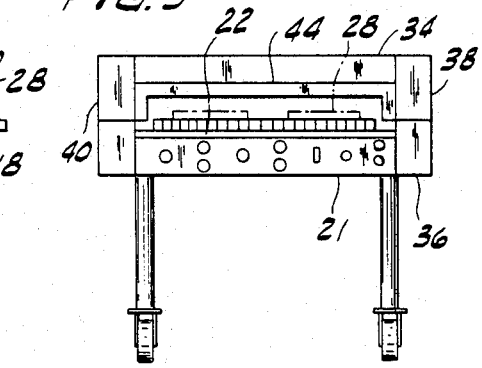
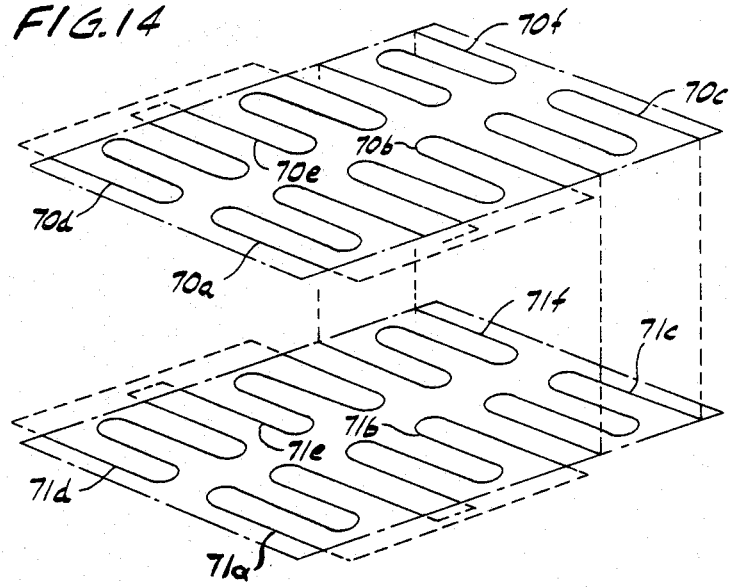

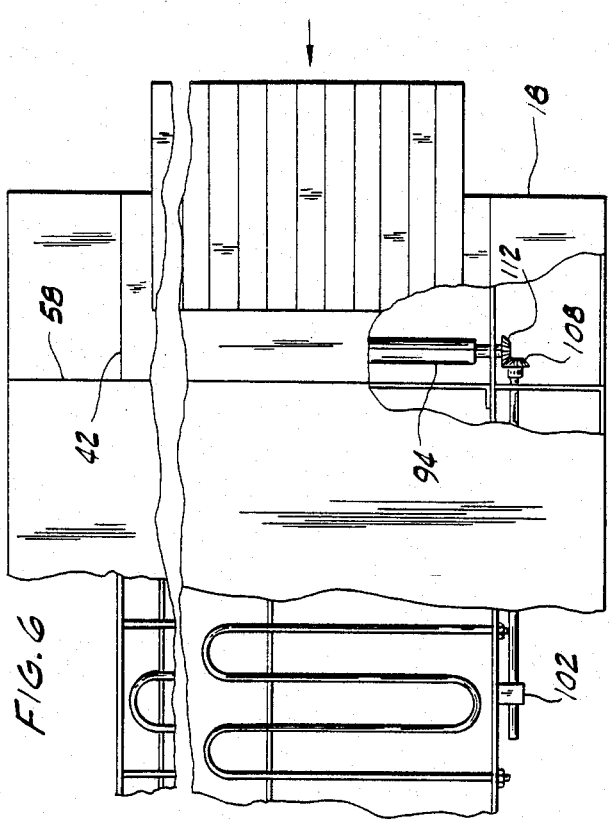
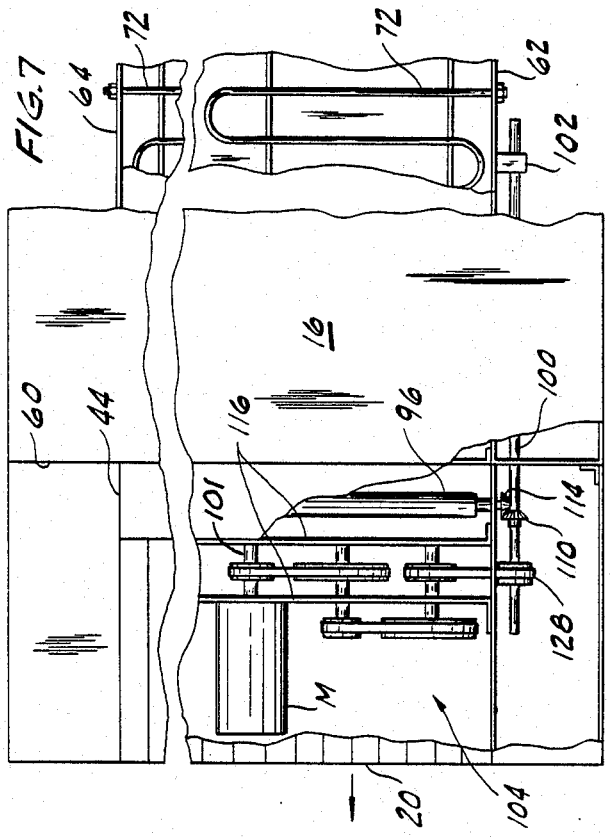
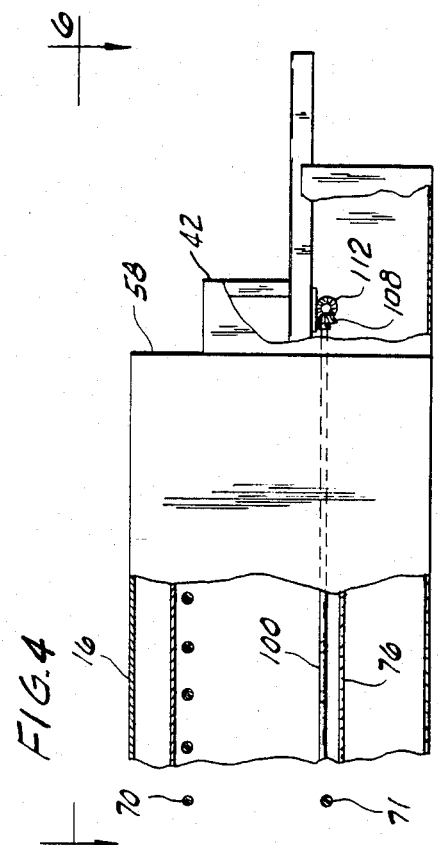
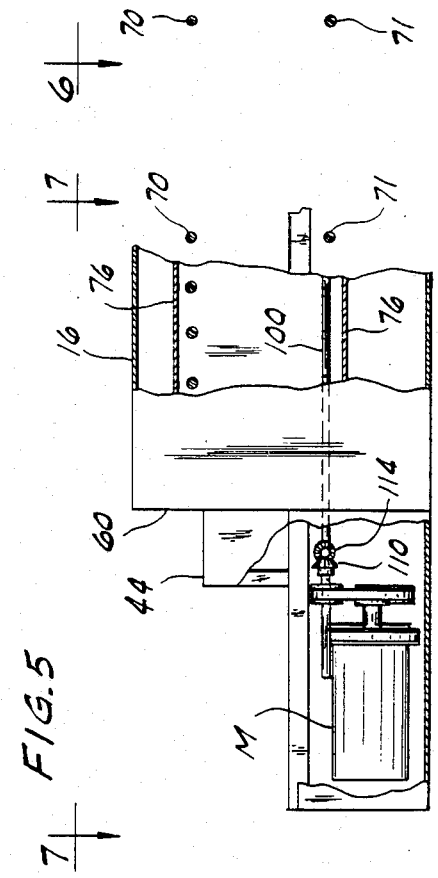

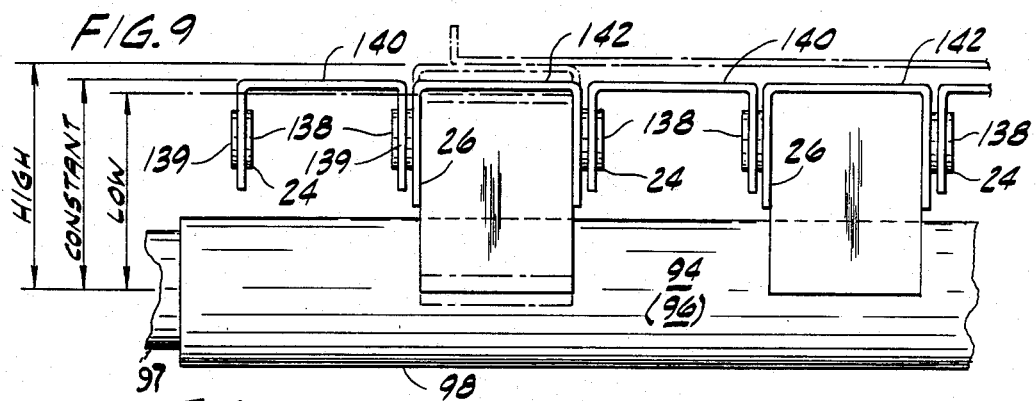
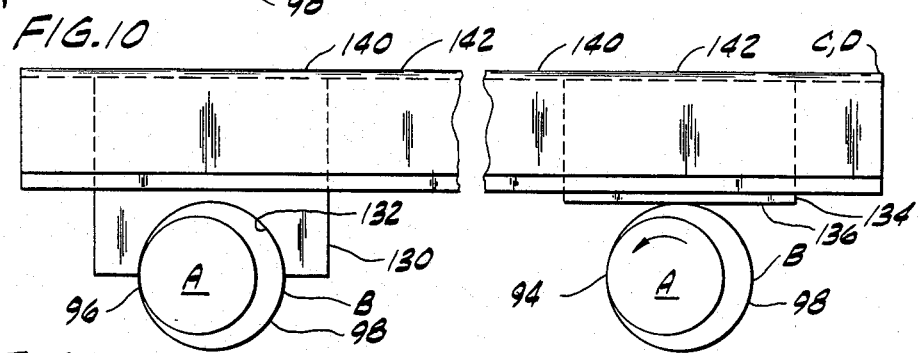
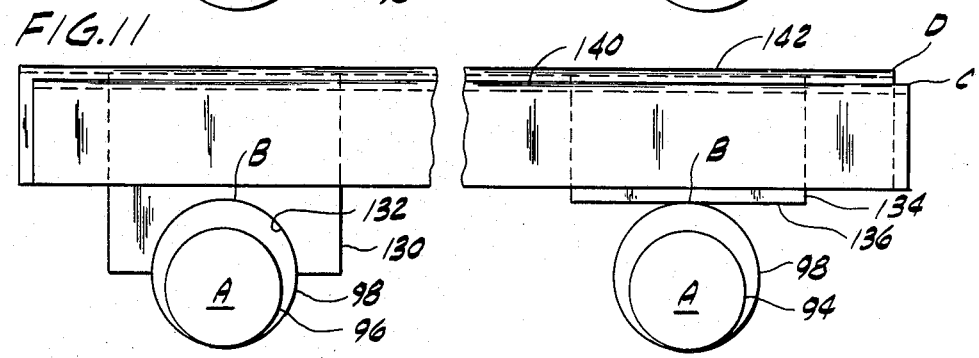
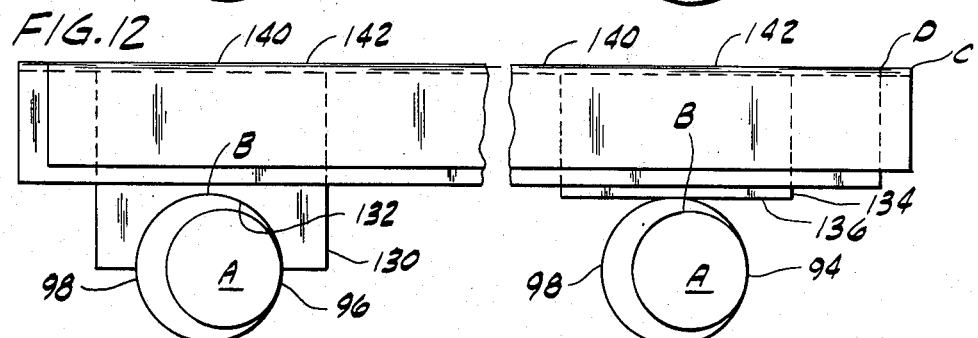
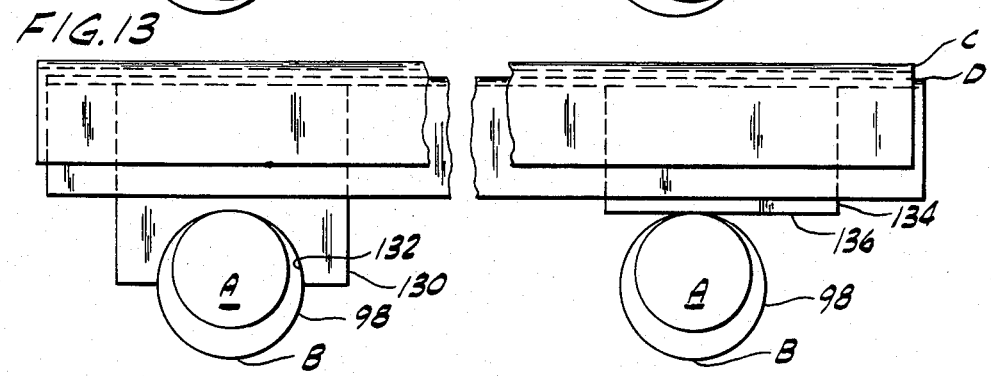

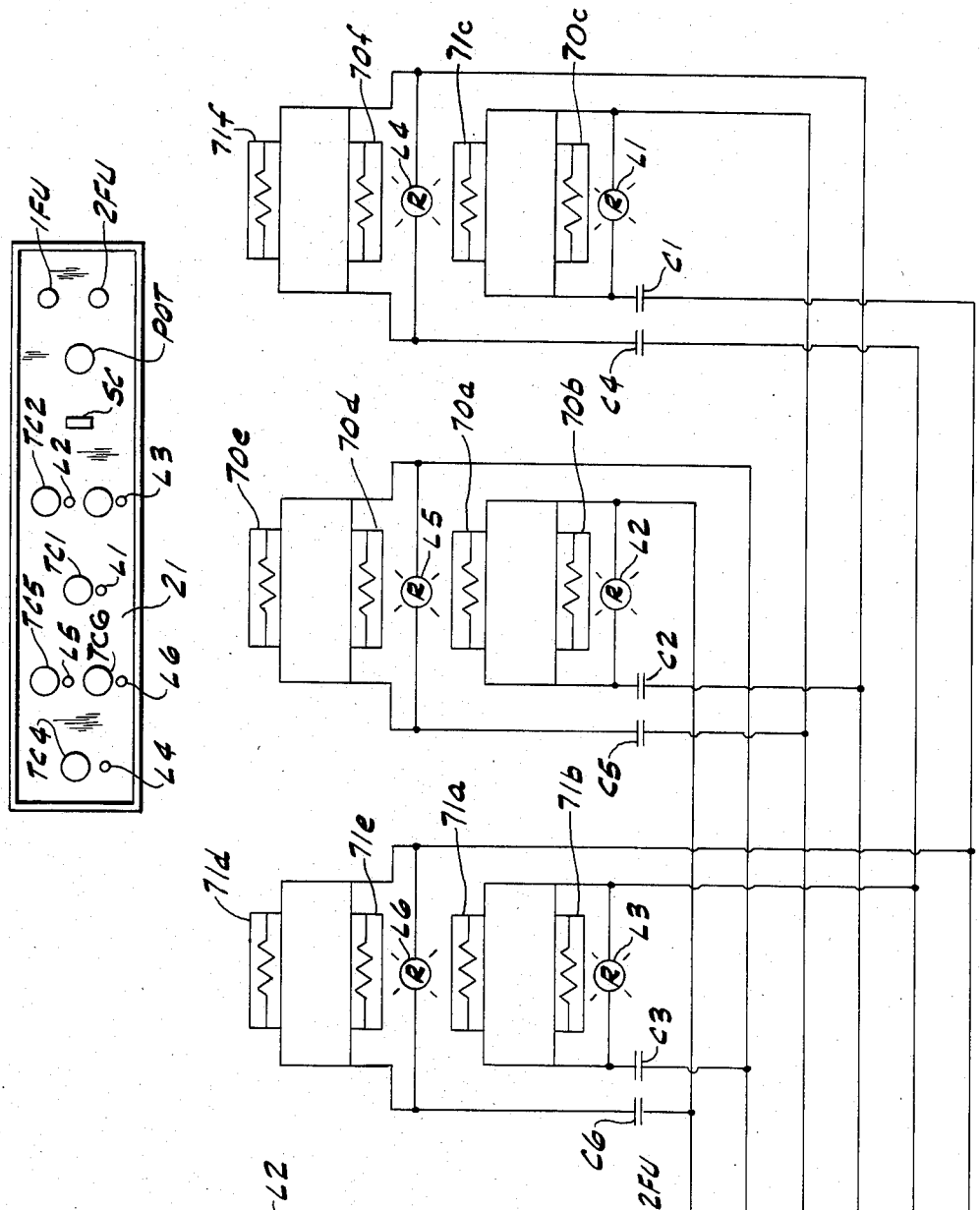

COOKING APPARATUS

BACKGROUND OF THE INVENTION

This invention relates generally to cooking apparatus and particularly to a cooking apparatus having an improved conveyor and heating system.

Restaurants of the type referred to as "fast food" as well as "full service" restaurants commonly use cooking apparatus which utilize a heating chamber in the form of a tunnel. Food to be cooked is conveyed through the heating chamber by an endless conveyor and overhead radiant heating is used in the cooking process. Examples of such apparatus are disclosed in U.S. Pat. No. 4,008,996 of Harold D. Wells; U.S. Pat. No. 4,245,613 of Harold D. Wells et al and U.S. Pat. No. 4,366,177 of Harold D. Wells et al.

One of the primary problems associated with the prior art apparatus is that of high energy consumption because of significant heat loss. Heat Loss results from several factors including the use of an endless conveyor having upper and lower spans which are continuously moving from the apparatus into the relatively cool ambient air. Another problem associated with the cooking process itself is that, unlike manual cooking, conveyor cooking in which a relatively enclosed tunnel is used does not readily permit the food product to be shuffled or shifted on the conveyor by use of a spatula. Further, linear movement through a conventional apparatus, without the use of fans to assist in moving the stratified air does not provide the desirable air agitation which enchances the cooking process.

The present invention solves these and other problems in a manner not disclosed in the known prior art.

SUMMARY OF THE INVENTION

This cooking apparatus provides a heating chamber and conveyor combination which minimizes heat loss, and optimizes even heat distribution resulting in significant energy savings of up to fifty percent (50%) as compared with conventional cooking apparatus.

In addition, the apparatus facilitates the cooking process by providing an intermittently moving conveyor surface having vertical as well as horizontal movement which tends to shuffle the product and move the air within the apparatus and distribute heat by convection as well as radiation and conduction.

This cooking apparatus includes a longitudinally extending housing assembly having a heating chamber with an upper portion, a lower portion, opposed side portions, a first end portion defining an entrance opening and a second end portion defining an exit opening; a heater assembly having an upper heater means housed in the upper portion of the heating chamber, and a control means for the heater means; and a longitudinally extending conveyor assembly including a plurality of first elongate rails and a plurality of second elongate rails disposed in side-by-side alternating relation with said first rails, each of said rails having a product carrying upper surface, said rails being disposed below the upper heater means, said conveyor assembly also including means for moving the common second rail surface in orbital relation relative to the common first rail surface.

In one aspect of this invention the first rails have a flat upper surface disposed in a common, substantially horizontal plane and the second rails have a flat upper surface disposed in a common movable substantially horizontal plane to move the product intermittently through the heating chamber while shuffling the product relative to the carrying surface.

It is another aspect of this invention to provide a heater assembly having a lower heater means housed in the lower portion of the heating chamber below the upper surface of the rails and to provide both upper and lower heater means with convex reflectors to improve heating distribution.

Yet another aspect of this invention is to provide that the moving means for the conveyor rails include transversely extending shafts disposed at the entrance end and the exit end of the housing, each of said shafts including eccentric portions carrying associated second rails to facilitate smooth movement of the product through the heating chamber.

Still another aspect of this invention is to provide the heater means with independent controls to provide zones of heating within the heating chamber.

Another aspect of this invention is to provide vestibule portions at each end of the heating chamber to retain heat within the chamber.

Yet another aspect of the invention is to provide at least one end of each rail with a longitudinally captive end support to permit expansion and contraction of the rails under temperature differential within the heating chamber yet provide that the rails can be readily lifted and pulled from the heating chamber to facilitate cleaning.

It is yet another aspect of this invention to provide channel-shaped first and second rails which include transverse perforations to reduce the conductive area and thereby reduce heat loss from the chamber.

Still another aspect of the invention is to provide outwardly extending rails having side spacers to facilitate transverse alignment of the rails and upwardly extending stops to prevent over-run of the product.

It is still another aspect of this invention to provide a method of depositing a product between first and second adjacent support surfaces, cyclically moving one of said support surfaces relative to the other support surface to separate the product intermittently from the other support surface and applying heat to the product continuously said movement providing heat distribution by convection to the underside of the product as well as the upper side of the product.

BRIEF DESCRIPTION OF THE DRAWINGS

FIG. 1 is an elevational view of the cooking apparatus carried on a mobile stand;

FIG. 2 is a plan view thereof;

FIG. 3 is an end view taken at the exit end of the conveyor;

FIG. 4 is an enlarged fragmentary elevational view of the apparatus taken at the entrance end of the conveyor;

FIG. 5 is an enlarged fragmentary elevational view of the apparatus taken at the exit end of the conveyor;

FIG. 6 is a fragmentary plan view taken on line 6—6 of FIG. 4;

FIG. 7 is a fragmentary view taken on line 7—7 of FIG. 5;

FIG. 9 is an enlarged view illustrating the eccentric shaft and the stationary and movable rails;

FIG. 10 is an enlarged view illustrating the movable conveyor rails in a first position in which the movable rails are coplanar with the stationary rails;

FIG. 11 is a similar view to FIG. 10 illustrating the movable rails in a second, raised position;

FIG. 12 is a similar view to FIG. 10 illustrating the movable rails in a third position in which the movable rails are coplanar but longitudinally shifted relative to the stationary rails;

FIG. 13 is a similar view to FIG. 10 illustrating the movable rails in a fourth lowered position;

FIG. 14 is a schematic rendering of the heater arrangement;

FIG. 15 is a schematic rendering of the control circuitry of the heater elements and drive motor;

FIG. 16 is a schematic rendering of the temperature control unit;

FIG. 17 is a schematic rendering of the control panel;

DESCRIPTION OF THE PREFERRED EMBODIMENT

Figure 8:
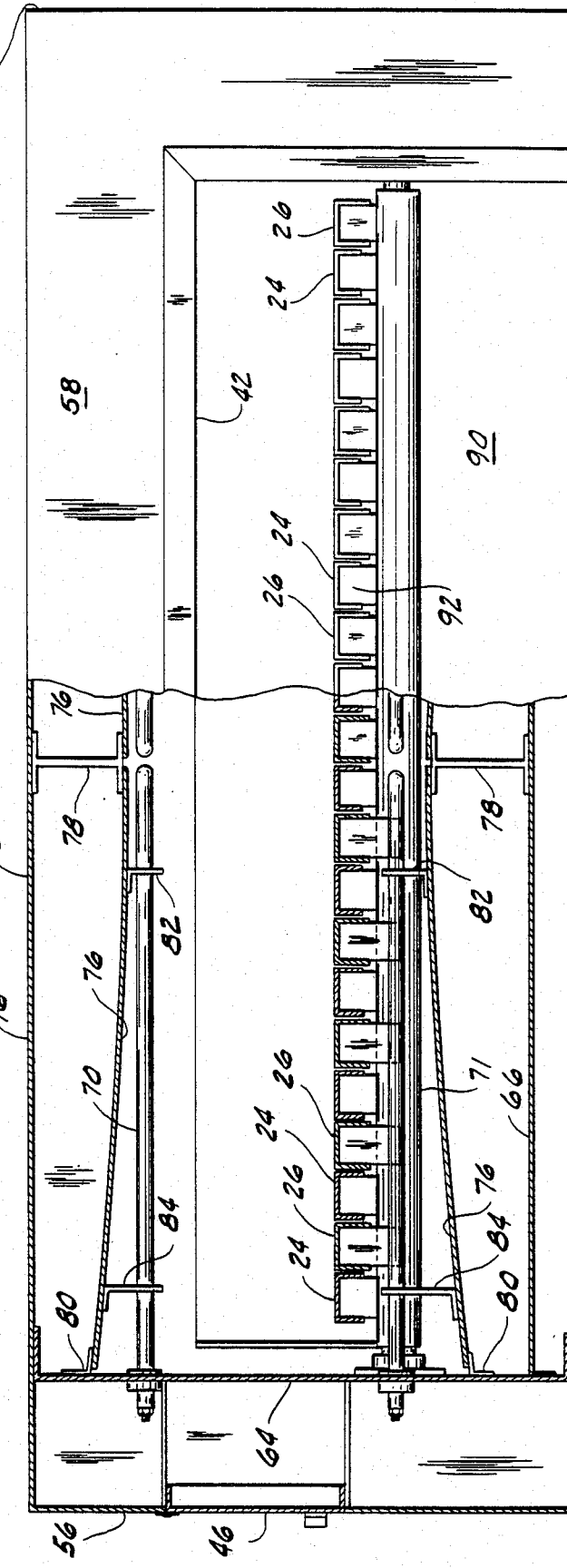
FIG. 8 is an enlarged cross sectional view taken on line 8—8 of FIG. 2.
Figure 18:
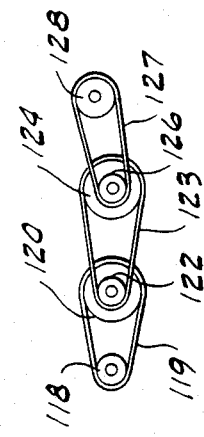
FIG. 18 is a schematic rendering of the drive transmission.

Referring now by reference numerals to the drawings and first to FIGS. 1, 2 and 3 it will be understood that the cooking apparatus generally indicated by numeral 10 is preferably carried by a mobile stand 12 and consists essentially of a longitudinally extending housing assembly 14, including a heating chamber 16 and end portions 18 and 20, and a conveyor assembly 22 consisting essentially of alternating rails 24 and 26 which cooperate to provide an article moving deck for moving a product such as trays 28 which move into the apparatus by way of an entrance opening 30 and exit by way of an exit opening 32.

The heating chamber 16 which, in the embodiment shown, is formed from sheet steel paneling, includes an upper portion 34, a lower portion 36, opposed side portions 38 and 40 and opposed end portions provided by vestibule members 42 and 44 which define the entrance opening 30 and the exit opening 32 respectively. In the embodiment shown the heating chamber near side 38 is provided with access doors 46 which permit products to be deposited onto the conveyor assembly 22 between its ends. The housing end portion 20 includes a control panel 21 as will be described.

The details of the cooking apparatus 10 will now be described with reference to FIGS. 4 through 12 and first with respect to FIGS. 4 through 8.

The heating chamber 16 is defined by upper panel 50, lower panel 52, side panels 54 and 56, a generally inverted U-shaped entrance end panel 58 and a similar exit end panel 60. In addition, the heating chamber 16 includes inner side panels 62 and 64 and a lower intermediate panel 66.

The upper portion 34 of the heating chamber 16 provides a housing for a tier of infra-red, tubular sheath radiant heater elements 70 disposed in opposed pairs three in number in the preferred embodiment. The heater elements 70 include outer legs 72 which are attached to the inner walls 62 and 64. An opposed pair of generally convex reflector plates 76 are disposed above the heater elements 70, said reflector plates being carried by an intermediate I-beam 78 welded, or otherwise attached, to the upper panel 50 and an elongate angle member 80 welded, or otherwise attached, to the inner side panel 64. The inner end and outer portions of the reflector plates 76 are provided with depending lugs 82 and 84 respectively which are attached thereto, as by welding, and which are longitudinally slotted to receive the inner ends of the radiant heater elements 70 and permit expansion thereof.

The lower portion of the heating chamber 16 includes a lower tier of radiant heater elements 71 which are similar to heater elements 70 of the upper tier and are provided with identical convex reflector plates 76 which are attached at their ends to support members 78 and 80, said support member 78 being attached to the lower intermediate panel 66. The upper and lower heater elements 70 and 71 provide a controlled heater assembly which will be discussed in greater detail.

The entrance and exit vestibules 42 and 44 disposed at opposite ends of the heating chamber provide short tunnel-like members which are attached to end panels 58 and 60 respectively and provide extended pasageways into and out of the heating chamber 16. The vestibules 42 and 44 tend to confine radiant heat to the useful working area within the heating chamber to stratify and reduce convection air losses at the open ends and make baffling or reduction of the passageway openings unnecessary.

The conveyor assembly rails 24 and 26 are disposed in alternating relation as clearly shown in FIG. 8. Both sets of rails extend outwardly of the heating chamber 16 to facilitate emplacement and removal respectively of the trays 28 or raw, unplated product such as pizza (not shown) before entry into the cooking chamber 16 and after exit of said trays from said chamber. The conveyor assembly rails 24 and 26 are disposed in alternating relation and both sets of rails extend outwardly of the heating chamber to provide platform areas to facilitate emplacement and removal respectively of products such as cooking trays 28 before entry into the heating chamber 16 and after exit from said chamber.

Rails 24 remain stationary during the conveying process and are horizontally aligned in coplanar relation. The rails 24 are supported at each end by transverse struts 90 notched to provide spaced tooth-like support members 92 at their upper end which receive the inverted channel-shaped rails 24 in clearance relation so that the rails can be readily removed for cleaning by simply lifting upwardly. The rails 24 are held in place longitudinally, at one end only, as by a pair of stop elements 93 on each side of supports 92, which permits free longitudinal movement of the rails due to heat expansion and contraction with the heating chamber 16.

Rails 26 also of inverted channel-shaped configuration are movable during the conveying process, as will be discussed below in greater detail, and are horizontally aligned in coplanar relation so that the upper surface thereof orbits relative to the upper surface of adjacent rails 24. The rails 26 are supported at each end by opposed transverse shafts 94 and 96 each of which includes ends 97 mounted for rotation between walls 64 and an elongate eccentric cylindrical portion 98. As best shown in FIGS. 4 and 5 the shafts 94 and 96 are rotated in the same direction by a drive system which includes a longitudinally extending shaft 100 rotated by the shaft 101 of a variable speed motor M through the medium of transmission assembly generally indicated by 104. The motor and transmission assembly are housed in the housing end portion 20. In the embodiment shown the motor M is a variable speed 0–90 volts D.C. induction motor, as shown in the circuit diagram FIG. 15 provided with a speed control SC.

The shaft 100 is supported by bearing brackets 102 attached to the heating chamber inside panel 64 and said shaft includes spaced bevel gears 108 and 110 attached thereto and engaging associated bevel gears 112 and 114 at the end of the transverse shafts 94 and 96 respectively.

The transmission 104 is mounted between support plates 116 and includes a motor shaft drive pulley 118 which is connected to the longitudinal drive shaft pulley 128 through the medium of pulleys 120, 122, 124 and 126 and associated belts 119, 123, and 127 as shown in FIG. 15.

The mounting of the rails 24 and 26 is best shown by reference to FIGS. 9-13. At one end, rails 26 are provided with a saddle block 130 of teflon or other suitable bearing material having an arcuate surface 132 with a radius substantially equal to the radius of the shaft eccentric 98. In the embodiment shown, the bearing surface 132 is generally semi-circular so that the saddle block is held by the eccentric 98 in captive relation to preclude longitudinal movement between the rails 26 and the eccentric 98 of shaft 94 while permitting relative longitudinal and vertical movement between the rails 26 and the rotational center of the shafts. At the other end, the rails 26 are provided with a block 134 having a flat bearing surface 136 of teflon or the like which is carried by the shaft 94. This arrangement of parts also permits the rails 26 to be readily removed by simply lifting upwardly from the saddle block end and pulling outwardly from the heating chamber 16. In addition, the provision of a saddle block connection at one end only permits free longitudinal movement of the rails due to heat expansion and contraction in the area within the heating chamber 16.

Figure 19:
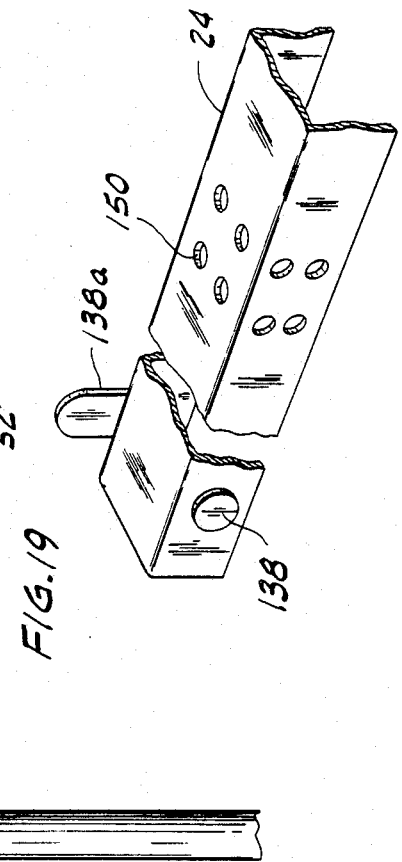
FIG. 19 is a fragmentary perspective view of the rails illustrating conductive-inhibiting perforations, alignment spacers and end stops.

As shown in FIGS. 9 and 19 alignment of the movable rails 26 relative to the stationary rails 24 is facilitated by the provision of snap-fit, grooved spacer inserts 138 of nylon, or the like, in openings 139 provided in the depending legs of said rails at each end of the rails away from the heated portions. In order to provide stop members to prevent the product from leaving the rails, selected spacers 138 a at each side of the exit end of the conveyor assembly can be provided which extend upwardly above the plane of the rails as shown in FIG. 19. If desired openings 139 can be elongated to prevent rotation of said stop members. As also shown in FIG. 19 both rails 24 and 26 are perforated on their upper surface and sides with a plurality of openings 150 which are located at each end of the rails in the vicinity of the entrance and exit opening 30 and 32 and also at a location about one-third of the length of the heating chamber 16 measured from the entrance end thereof to separate the heating zones. These openings reduce the area of the cross section at least 50% and act to reduce heat loss by conduction from the portion of the rails disposed inside the heating chamber 16 as well as between said heating chamber and the portion of the rails disposed outside of the heating chamber.

The operation of the conveyor assembly and particularly the relative movement of the rails 24 and 26 is best understood by reference to FIGS. 9 through 13. It will be understood that the transverse shafts 94 and 96 are identical in that each shaft eccentric 98 provides a cam moving the horizontal upper surface 142 of rails 26 in orbital motion relative to the horizontal upper surface 140 of adjacent rails 24. The effect of this camming action is illustrated by considering coordinate movement of corresponding points on the rails 24 and 26 as the eccentric 98 rotates through four quandrants.

For explanatory purposes the fixed center of rotation of the shafts 94 and 96 is indicated by point A and the rotation of the surface of the eccentric indicated by point B. The rail 24 is stationary and for convenience the entrance and corner of said rail is chosen as reference point C while the corresponding corner of the movable rail 26 is chosen as point D.

Initially, as shown in FIG. 10, the rails surfaces 140 and 142 are coplanar and the points C and D are coincident. After movement of point B through one quandrant, as shown in FIG. 11, surface 142 is disposed above surface 140 as illustrated by the position of point D relative to fixed reference point C. After movement of point B through two quandrants, as shown in FIG. 12, surface 142 is again coplanar to surface 140 but there has been a forward shift of the surfaces as illustrated by the position of point D relative to reference point C. After movement of point B through three quandrants, as shown in FIG. 13, surface 142 is disposed below surface 140 as illustrated by the position of point D relative to reference point C. After movement of point B through four quandrants rails 24 and 26 are again coplanar and points C and D are again coincident as shown in FIG. 9 which completes one revolution of the shafts 94 and 96. Thus, as the shafts 94 and 96 move through one cycle or revolution, a product is moved intermittently through a distance equal to the difference between the diameter of the eccentric and the diameter of the ends 97 of shafts 94 and 96. In the case of a differential of one-quarter inch, the longitudinal movement is also one-quarter inch while the upward and downward displacements are an eighth of one inch respectively. The result of this is that the product is lifted and moved forwardly these amounts each cycle or revolution of the shafts.

The heater assembly control system is best understood by reference to FIGS. 14-17 which illustrate the heater arrangement and the circuitry in schematic form. In the embodiment shown, see FIG. 14, each row of upper heater elements 70a, 70b, 70c, and 70d, 70e, 70f, is disposed above a lower row of heaters 71a, 71b, 71c, and 71d, 71e, 71f respectively. The right hand rows of heaters 70a, 70b, 70c, and 71a, 71b, 71c on one side of the longitudinal axis of the heating chamber 16 are controlled independently of the left hand row of heaters 70d, 70e, 70f, and 71d, 71e, 71f, on the other side of the longitudinal axis. FIG. 14 illustrates, by broken lines, the cooperative arrangement of the heater elements.

It has been determined that it is an advantage to have higher temperature heaters at the entrance end of the heating chamber and for this reason, as shown in FIG. 14 and FIG. 15, the right hand row upper heater 70c (3300w) and lower heater 71c (1975w) at the entrance end are connected and controlled by contactor C1; the upper heater 70a (1975w) at the exit end and the intermediate upper heater 70b (1975w) are controlled by contactor C2 and the lower heater 71 (1450w) at the exit end and the intermediate lower heater 71b (1450w) are controlled by contactor C3. Similarly, the left hand row upper heater 70f (3300w) and lower heater 71f (1975w) at the entrance end are connected and controlled by contactor C4; the upper heater 70d (1975w) at the exit end and the intermediate heater 70e (1975w) are controlled by contactor C6 and the lower heater 71d (1450w) at the exit end and the intermediate lower heater 71e (1450w) are controlled by contactor C6.

As shown in FIGS. 15 and 16 the heater contactors C1–C6 are energized by corresponding temperature control and power switching units indicated by TC1–TC6. Such units are exemplified by Model 35AA-2600-1100 single pole units as manufactured by Watlow of Winona, Minn. As will be readily understood, each contactor for example C1 is connected to a corresponding temperature control such as TC1 which permits independent temperature setting of the heaters 70c and 71c. As will also be readily understood this arrangement permits considerably versatility in apparatus temperature control.

It is thought that the structural features and functional advantages of this cooking apparatus have become fully apparent from the foregoing description of parts but for completeness of disclosure the operation of the apparatus will be briefly described.

The speed of the conveyor assembly 22 and the temperature adjustment of the heater elements 70 and 71 are adjusted to suit the particular product to be cooked. When this adjustment has been made the product is either placed directly onto the upper surface of the conveyor rails 24 and 26 (in the case of pizza for example) or are placed in trays (in the case of buns) and the trays are then placed on the rails.

The product, for example trays 28, are placed on the outwardly extending portion of the conveyor. It will be understood that the length of this outwardly extending portion can be increased or decreased by the simple expedient of using longer or shorter rails since, unlike conventional conveyors, the length of the conveyor deck is not dependent on the center-to-center distance between the transverse shafts 94 and 96.

Rotation of the shafts 94 and 96, which carry the rails 26, results in orbital movement of the rails 26 relative to the rails 24 with the result that the articles are lifted by the rails 26 from the rails 24, moved forwardly and again lowered and deposited onto the rails 24. The rails 26 continue downward and rearward movement to return to their original postion in the course of one cyclical revolution of the shafts 94 and 96. In the preferred embodiment the center of rotation of the shafts 94 and 96 is one-eighth inch ($\frac{1}{8}$") from the center of the shaft eccentric portion 98 which results in a high position of the article one-eighth inch above the upper surface 140 of rails 24 and intermittent incremental forward movement of the product a distance of one-quarter inch.

Radiant heat from the upper tier of heater elements 70 is directed downwardly onto the upper surface of the rails 24 and 26 and consequently on the upper surface of the cooking products, the radiant heat being directed downwardly by virtue of the reflector plates 76. The reflector plates 76 are generally convex with the results that the heat tends to move outwardly rather than to be concentrated in the center of the heating chamber, resulting in a more even distribution of heat. The lower convex reflector 76 directs radiant heat from the lower tier of heater elements 71 upwardly onto the underside of the rails 24 and 26 and therefore reaches the cooking product indirectly by passing through the upper portions of the rails. As with the upper heaters 70, the convex shape also causes heated air to converge outwardly thereby providing convection heating as well as radiant heating.

It is well known that, in the conventional cooking of products such as pizza, it is necessary to move the product constantly by using a spatula to raise and redeposit the product to prevent sticking to the hot cooking surface. This particular procedure undoubtedly assists the cooking process by allowing air agitation underneath the cooking product and in the case of radiant, and also griddle heating, prevents a cold spot from developing under the product. It is believed that a similar advantageous process takes place automatically with the conveyor assembly 22 in which, unlike a conventional belt conveyor for example, cold spots are not permitted to develop and, to the contrary, the relative movement of the rails keeps the air agitated and provides heat distribution to all of the outer surface of the product by up and down motion of the product, as illustrated in FIG. 9 as well as transporting the product forwardly.

Further, moving the product consistently to new heated areas enchances the conduction heating process while balancing uniformity of the cooking. Thus, the cooking system promotes the benefits of all three heat transfer methods to the article, namely, infrared radiation, convection and conduction. Moreover, the orbital motion of the conveyor rail surface provided by rails 26 moves the article through the heating chamber in a manner that increases the velocity of the heated air onto the article so that it is unnecessary to use fans to provide convective air movement, the transportation speed being such that the product is moved through a four feet long heating chamber in a time period of between $2\frac{1}{2}$ minutes–19 minutes depending on the product and the temperature setting.

The upper and lower heater elements 70 and 71 are temperature controlled so that the heat applied during the initial cooking stage as the product enters the heating chamber is greater than that during the remaining stage. This also results in energy savings.

The provision of entrance and exit vestibule portions 42, of the heating chamber 16 results in less heat loss and the fact that the conveyor deck as a whole is virtually stationary means that, unlike a conventional endless belt conveyor, the heated deck does not circulate from a hot apparatus area to a cold ambient area which results in further energy savings. Further, the provision of openings 150 prevents conduction of heat out of the heating chamber 16 between the inner heated zone and the outer cooler zone, and between different heating zones within the chamber. Thus the initial heating stage can be maintained at 700° F. while the second stage can be maintained at 400° F. with a substantially clear temperature differential existing between the zones.

Essentially, the cooking method outlined above provides that a product can be deposited between two adjacent support surfaces, one of which is cyclically moved relative to the other by camming so that the product is intermittently separated from one of the support surfaces and is shifted in position to facilitate the cooking process by breaking tension between the product surface and the cooking surface.

In view of the above it will be seen that various aspects and features of the invention are achieved and other advantageous results attained. While preferred embodiments of the invention have been shown and described, it will be obvious to those skilled in the art that changes and modifications may be made therein without departing from the invention in its broader aspects.

I claim as my invention:

1. A cooking apparatus comprising:
   (a) a longitudinally extending housing assembly including a heating chamber having an upper portion, a lower portion, opposed side portions, a first end portion defining an entrance opening and a second end portion defining an exit opening,
   (b) a heater assembly including an upper and lower heater means, housed in the upper portion of the heating chamber, and control means for the heater means, and
   (c) a longitudinally extending conveyor assembly including a plurality of first elongate rails and a plurality of second elongate rails disposed in side-by-side alternating relation with said first rails, each of said rails having a product carrying upper surface, and said rails being disposed below the upper heater means, said conveyor assembly also including means for moving the second rail surfaces in orbital relation relative to the first rail surfaces, said lower heater means being disposed below the first and second rails to heat said rails and provide a hearth-like product carrying surface.

2. An apparatus as defined in claim 1, in which:
   (d) said first rails have a flat upper surface disposed in a common stationary substantially horizontal plane and said second rails have a flat upper surface disposed in a common movable substantially horizontal plane, said moving means including a first transverse shaft having a substantially fixed axis of rotation and a second transverse shaft having substantially fixed axis of rotation said first and second shafts operatively carrying said second rails in said orbital relation to said first rails.

3. An apparatus as defined in claim 1, in which :
   (d) the upper and lower heating means each includes a plurality of heater elements disposed in opposed rows, the lower heater elements being disposed below the rails, and the control means controls the heat of said upper and lower elements independently to define differential heating zones within the chamber whereby elements closer to the ends of the chamber provide more heat than longitudinally inward elements.

4. An apparatus as defined in claim 1, in which:
   (d) the heating chamber includes relatively short vestibule portions at each end.

5. An apparatus as defined in claim 1, in which:
   (d) the first and second rails are channel-shaped and include transverse perforations to reduce the heat conductive area.

6. An apparatus as defined in claim 1, in which:
   (d) the first and second rails are generally channel-shaped and include end portions extending outwardly of the heating chamber, said end portions having depending legs, adjacent legs of said rails having spacer elements attached to one of said legs.

7. An apparatus as defined in claim 1, in which:
   (d) the first and second rails are generally channel-shaped and include end portions extending outwardly of the heating chamber, said end portions having depending legs, adjacent legs of at least one of said rails having upwardly extending stop means attached thereto.

8. A cooking apparatus comprising:
   (a) a longitudinally extending housing assembly including a heating chamber having an upper portion, a lower portion, opposed side portions, a first end portion defining an entrance opening and a second end portion defining an exit opening,
   (b) a heater assembly including an upper heater means, housed in the upper portion of the heating chamber, and control means for the heater means, and
   (c) a longitudinally extending conveyor assembly including a plurality of first elongate rails and a plurality of second elongate rails disposed in side-by-side alternating relation with said first rails, each of said rails having a product carrying upper surface, and said rails being disposed below the upper heater means, said conveyor assembly also including means for moving the second rail surfaces in orbital relation relative to the first rail surfaces,
   (d) the upper heater means including a plurality of heater elements and a longitudinally extending reflector panel disposed above the heater elements, said panel having transverse configuration such that the elevation of the panel increases outwardly.

9. A cooking apparatus comprising:
   (a) a longitudinally extending housing assembly including a heating chamber having an upper portion, a lower portion, opposed side portions, a first end portion defining an entrance opening and a second end portion defining an exit opening,
   (b) a heater assembly including an upper heater means, housed in the upper portion of the heating chamber, and control means for the heater means, and
   (c) a longitudinally extending conveyor assembly including a plurality of first elongate rails and a plurality of second elongate rails disposed in side-by-side alternating relation with said first rails, each of said rails having a product carrying upper surface, and said rails being disposed below the upper heater means, said conveyor assembly also including means for moving the second rail surfaces in orbital relation relative to the first rail surfaces.
   (d) the heater assembly including a lower heater means housed in the lower portion of the heating chamber below the upper surface of the rails and control means for the lower heater means,
   (e) the lower heater means including a plurality of heater elements and a longitudinally extending reflector panel disposed below the heater elements, said panel having a transverse configuration such that the elevation of the panel decreases outwardly.

10. A cooking apparatus comprising:
    (a) a longitudinally extending housing assembly including a heating chamber having an upper portion, a lower portion, opposed side portions, a first end portion defining an entrance opening and a second end portion defining an exit opening,
    (b) a heater assembly including an upper heater means, housed in the upper portion of the heating chamber, and control means for the heater means, and
    (c) a longitudinally extending conveyor assembly including a plurality of first elongate rails and a plurality of second elongate rails disposed in side-by-side alternating relation with said first rails, each of said rails having a product carrying upper surface, and said rails being disposed below the upper heater means, said conveyor assembly also including means for moving the second rail surfaces in orbital relation relative to the first rail surfaces, (d) the moving means including a first transversely extending shaft disposed at the entrance end of the housing and a second generally parallel shaft disposed at the entrance end of the housing each of said shafts including eccentric portions operatively carrying associated second rail portions to orbit the plane of the second rails relative to the plane of the first rails.

11. An apparatus as defined in claim 10, in which:

(e) the shafts include concentric shaft portions at each end the eccentric shaft portions are provided by an elongate intermediate eccentric portion.

12. An apparatus as defined in claim 10, in which:

(e) the moving means includes a variable speed motor drive shaft and a longitudinally extending shaft operatively connected to said drive shaft in drive relation and means connecting said longitudinal shaft to each of said transverse shafts in drive relative to rotate said transverse shafts in the same direction.

13. An apparatus as defined in claim 10, in which:

(e) at least one end of each second rail includes a bearing engageable with an eccentric portion of a transverse shaft in captive relation.

14. An apparatus as defined in claim 10, in which:

(e) at least one end of each second rail includes a bearing engageable with an eccentric portion of a transverse shaft in longitudinally captive relation and the other end of the rail includes a bearing engageable with the eccentric portion of the shaft in non-captive relation.

15. An apparatus as defined in claim 10, in which:

(e) the housing assembly includes a first transverse support member at the entrance end of the housing and a second generally parallel support member at the exit end of the housing said support members carrying the first rail members.

(f) the first and second rails are generally channel-shaped having the bight portion uppermost, and (g) the transverse support members including a plurality of notched portions providing spaced portions each receiving a first rail in supporting relation.

16. An apparatus as defined in claim 10, in which:

(e) the second rails are carried by the shafts in upwardly liftable removable relation.

17. An apparatus as defined in claim 16, in which:

(f) the first rails are carried by the support members in upwardly liftable removable relation.

* * * * *